(12) United States Patent
Meerovich

(10) Patent No.: US 9,703,677 B2
(45) Date of Patent: Jul. 11, 2017

(54) CODE COVERAGE PLUGIN

(71) Applicant: Red Hat Israel, Ltd., Raanana (IL)

(72) Inventor: Ilia Meerovich, Haifa (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/861,666

(22) Filed: Sep. 22, 2015

(65) Prior Publication Data

US 2017/0083430 A1 Mar. 23, 2017

(51) Int. Cl.
  *G06F 9/44* (2006.01)
  *G06F 11/36* (2006.01)
  *G06F 11/14* (2006.01)
  *G06F 11/22* (2006.01)

(52) U.S. Cl.
  CPC ...... *G06F 11/3644* (2013.01); *G06F 11/1451* (2013.01); *G06F 11/1469* (2013.01); *G06F 11/3676* (2013.01); *G06F 11/2236* (2013.01); *G06F 2201/84* (2013.01)

(58) Field of Classification Search
  CPC ............ G06F 11/30–11/3696; G06F 2201/895
  See application file for complete search history.

(56) References Cited

U.S. PATENT DOCUMENTS

| | | | |
|---|---|---|---|
| 5,742,754 A * | 4/1998 | Tse | G06F 11/3688 714/38.14 |
| 7,296,261 B2 | 11/2007 | Witchel et al. | |
| 7,503,037 B2 | 3/2009 | Banerjee et al. | |
| 7,926,042 B2 | 4/2011 | Mehta et al. | |
| 8,381,194 B2 | 2/2013 | Wang | |
| 8,707,264 B2 | 4/2014 | Hossain et al. | |
| 9,087,153 B2 * | 7/2015 | Filachek | G06F 11/3636 |
| 2003/0188301 A1 * | 10/2003 | Bates | G06F 11/3676 717/158 |
| 2008/0307391 A1 * | 12/2008 | Goel | G06F 11/3676 717/115 |
| 2009/0313607 A1 * | 12/2009 | Harding | G06F 11/3676 717/125 |
| 2010/0169874 A1 * | 7/2010 | Izard | G06F 8/71 717/170 |

(Continued)

OTHER PUBLICATIONS

Perez, Alexandre et al., "A dynamic code coverage approach to maximize fault localization efficiency", 2014, pp. 18-28.*

(Continued)

*Primary Examiner* — Thuy Dao
*Assistant Examiner* — Christopher Franco
(74) *Attorney, Agent, or Firm* — Lowenstein Sandler LLP

(57) ABSTRACT

A method for starting a level of testing on a first package file is disclosed. The method receives, via an application programming interface, at a plugin, a request to start the level of testing on the first package file. The method further modifies, by the plugin, the memory data structure utilized for the testing in middleware, to register a code coverage tool used to perform the testing at the level on the first package file. The method further launches the code coverage tool to start the level of testing by replacing the first package file with the second package file that has been modified and instrumented by the code coverage tool. The method further adds the code coverage tool as a dependency for the second package file.

20 Claims, 5 Drawing Sheets

(56) References Cited

U.S. PATENT DOCUMENTS

| | | | | |
|---|---|---|---|---|
| 2012/0084538 A1* | 4/2012 | Alapati | ............... | G06F 11/2236 |
| | | | | 712/227 |
| 2013/0117730 A1* | 5/2013 | Wisniewski | ........ | G06F 11/3664 |
| | | | | 717/125 |
| 2013/0298110 A1 | 11/2013 | Boden et al. | | |
| 2014/0201703 A1* | 7/2014 | Boden | ................. | G06F 11/3676 |
| | | | | 717/101 |
| 2016/0259712 A1* | 9/2016 | Fazunenko | ......... | G06F 11/3676 |

OTHER PUBLICATIONS

Haubl, Christian et al., "Deriving Code Coverage Information from Profiling Data Recorded for a Trace-based Just-in-time Compiler", 2013, pp. 1-12.*

Sensalire, Mariam et al., "Classifying Desirable Features of Software Visualization Tools for Corrective Maintenance", 2008, pp. 87-90.*

Perez, Alexandre et al., "A Topology-Based Model for Estimating the Diagnostic Efficiency of Statistics-Based Approaches", 2012, pp. 171-173.*

Adler, Yoram et al., "Advanced code coverage analysis using substring holes", 2009, pp. 37-46.*

Tran, Albert et al., "Student Paper: A Hardware-Assisted Tool for Fast, Full Code Coverage Analysis", 2008, pp. 321-322.*

The Apache Ant Project, http://ant.apache.org, accessed Sep. 14, 2015, 3 pages.

JaCoCo—Offline Instrumentation, http://www.eclemma.org/jacoco/trunk/doc/offline.html, accessed Sep. 14, 2015, 2 pages.

JBoss, "Class Loading in AS7", https://docs.jboss.org/author/display/AS7/Class+Loading+in+AS7?_sscc=t#, accessed Sep. 14, 2015,15 pages.

EAR (File Format), Wikipedia, https://en.wikipedia.org/wiki/EAR_%28file_format%29, accessed Sep. 14, 2015, 3 pages.

Menegay, Chris [How Do I:] Enable Code Coverage and Profiling in Production Applications?, http://www.asp.net/web-forms/videos/vs-2005/how-do-i-enable-code-coverage-and-profiling-in-production-applications, Aug. 22, 2007, 2 pages.

"ActionScript Code Coverage Plug-in for Flash Builder", http://www.adobe.com/devnet/flash-builder/articles/ascode-coverage.html, May 4, 2011, 2 pages.

"Unit Tests Code Coverage Plugin-Plugin Detail," http://plugins.netbeans.org/plugin/5620/unit-tests-code-coverage-plugin, 2008, 4 pages.

Majun, "Code Coverage v2 for Firebug 0.1.1-Signed", https://addons.mozilla.org/en-us/firefox/addon/code-coverage-v2-for-firebug/, accessed Sep. 22, 2015, 2 pages.

"Enabling the Clover Add-on", https://confluence.atlassian.com/display/BAMBOO/Enabling+the+Clover+add-on, accessed Sep. 22, 2015,15 pages.

"Cobertura Plugin", https://wiki.jenkins-ci.org/display/JENKINS/Cobertura+Plugin, Oct. 25, 2014, 10 pages.

\* cited by examiner

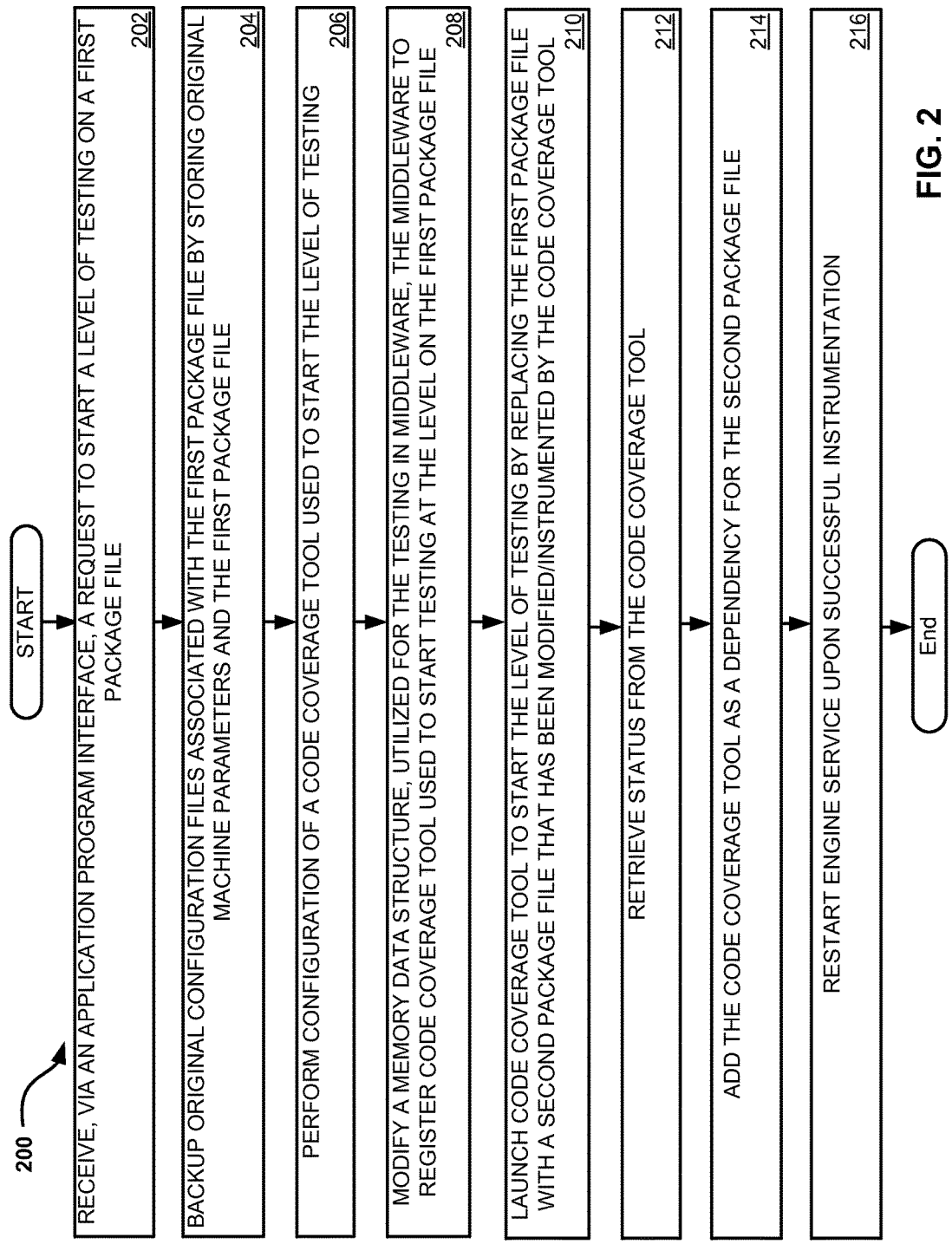

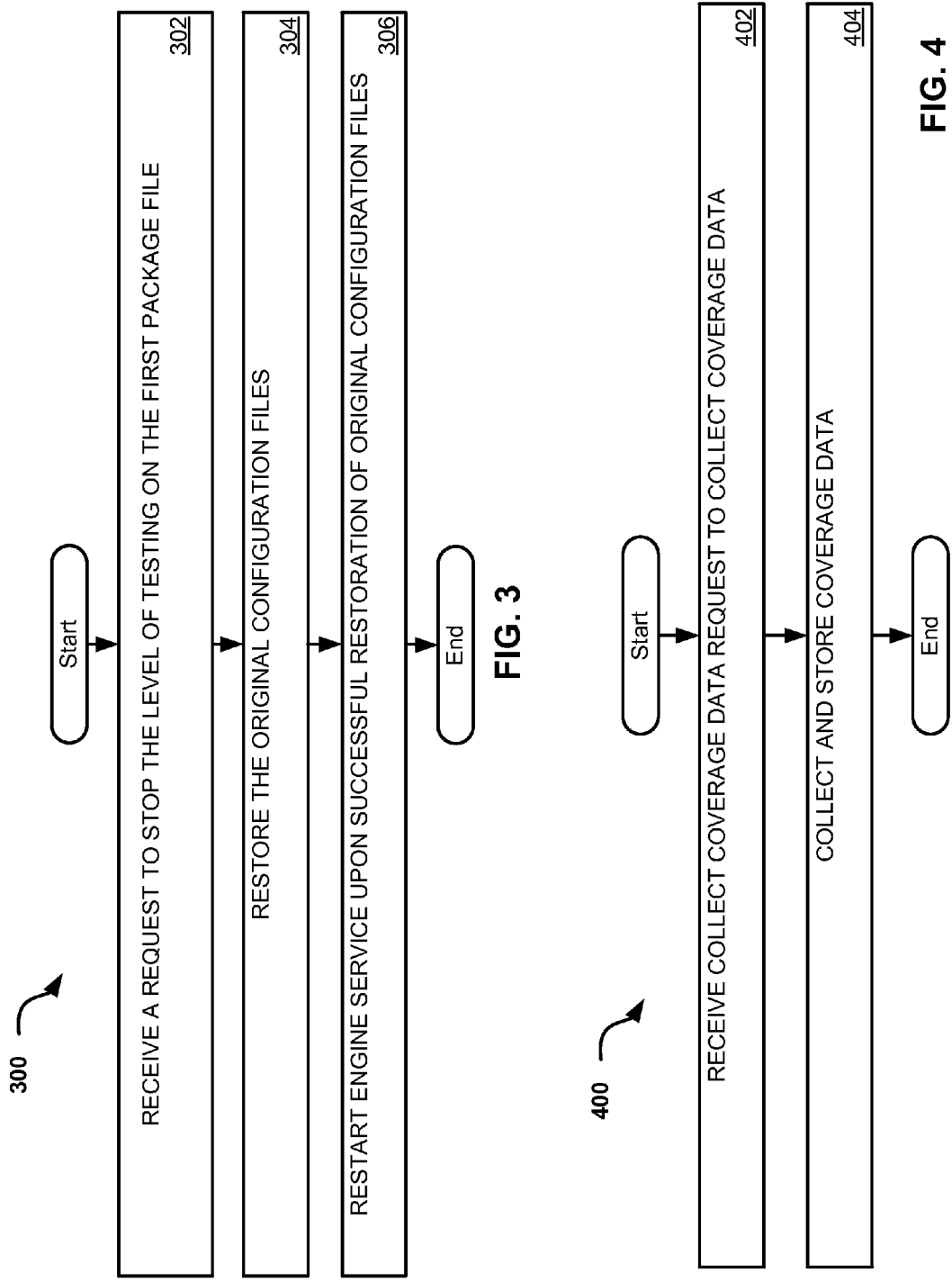

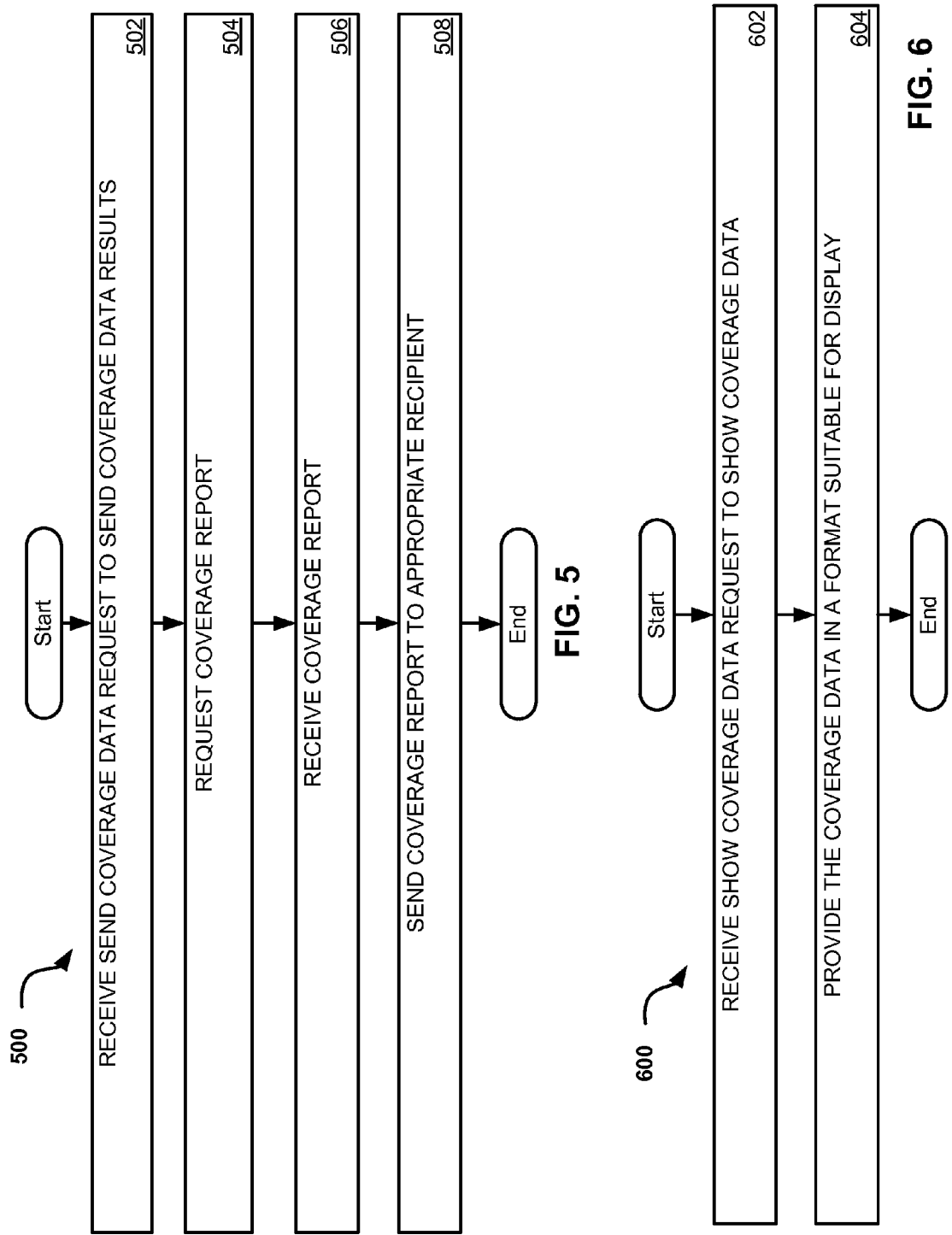

CODE COVERAGE PLUGIN

TECHNICAL FIELD

This disclosure is related generally to software testing, and more particularly, to providing a code coverage plugin associated with a software product.

BACKGROUND

Software testing is a process performed to evaluate the quality of the software product or service being tested. Test techniques include, but are not limited to, the process of executing a test case to run a program, project, or application in a controlled environment with a set of test inputs or execution conditions to verify compliance with a specific requirement.

Code coverage is a metric that may be used to describe the level or degree to which the source code of a software application is tested by a particular test case. A program with high code coverage has been more thoroughly tested and has a lower chance of containing software bugs than a software application with low code coverage.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are for explanation and understanding only.

FIG. 2 is a flow diagram illustrating an example method for starting code coverage, according to an implementation of the disclosure;

FIG. 3 is a flow diagram illustrating an example method for stopping code coverage, according to an implementation of the disclosure;

FIG. 4 is a flow diagram illustrating an example method for collecting coverage data, according to an implementation of the disclosure;

FIG. 5 is a flow diagram illustrating an example method for sending coverage data, according to an implementation of the disclosure;

FIG. 6 is a flow diagram illustrating an example method for showing code coverage, according to an implementation of the disclosure.

DETAILED DESCRIPTION

Figure 1:
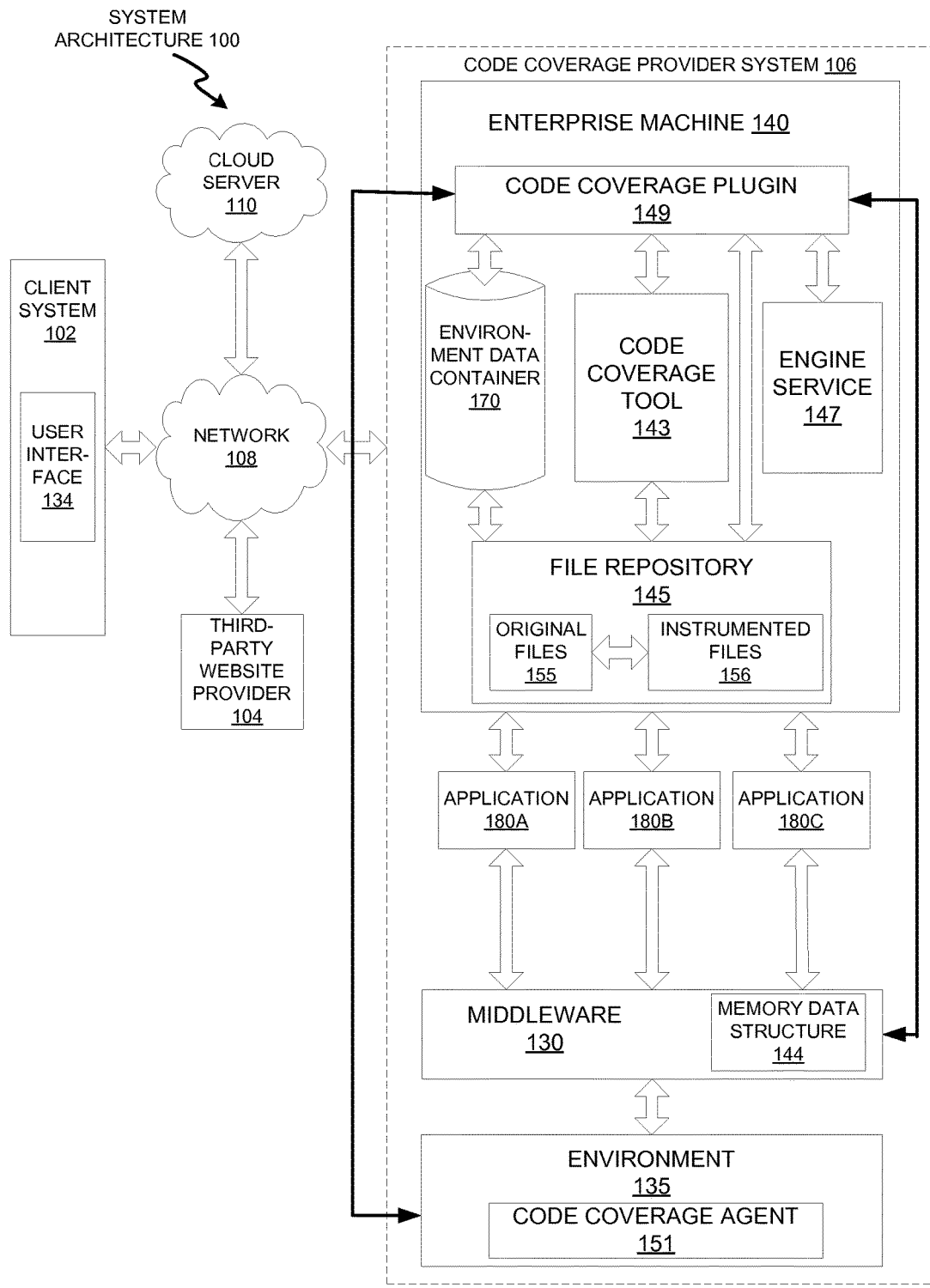
FIG. 1 is a block diagram of an example system architecture for implementing a code coverage plugin.

A method and apparatus for implementing a code coverage plugin used to test source code is described. Traditionally, in order to perform testing on source code and provide code coverage for the source code, a special product build/environment is needed. A considerable amount of configuration is required for such a build. Moreover, a software developer having a special skill in the particular software/product can perform configuration for code coverage. Integrated development environments (IDEs) and software development kits (SDKs or devkits) that are currently available contain/support code coverage features requiring a great deal of configuration to be performed by an expert. Code coverage features may be a specific build file that may build a code-coverage enabled product from source files. Code coverage features may be used within an IDE. Code coverage features may include preconfigured environment variables. Thus, testing performed, as specified by code coverage, may be performed by specialized software developers as part of a separate development process of the software.

As software becomes more complex and diverse, developers must be specially trained in order to perform testing. The present disclosure addresses the above noted and other deficiencies by providing a system that allows for performance of testing of software at a provider system (e.g., a customer site) that can be utilized without requiring specific knowledge of the particular software/product or a specific development environment. Thus, the code coverage should not require a special IDE, development kit or a special environment. Additionally, testing can be performed by a manual tester, a customer, or a field application engineer (FAE) at a provider system (e.g., a customer site) in order to ease debug on-site customer issues. A customer site may be a complex ecosystem of various software and hardware. Each new installation of software on customer site may be a complex process. If a code coverage feature is encapsulated in a product that already passed various evaluation and staging environments, it may be launched easily, if needed. If code coverage (or a code coverage feature) is not encapsulated as a part of a product, the production environment may need to be modified. Additionally, a new, additional, untested code coverage feature may need to be installed on the environment. However, if code coverage is not encapsulated, it may cause a production environment on a customer site to stop working properly. Additionally, if code coverage is not encapsulated, the product is more prone to human errors. If a code coverage feature is encapsulated in a product, then the product may contain a code coverage tool as a code coverage plugin dependency. The product may contain data that needed for code coverage (such as an environment data container) and information on how the data may be used by a code coverage plugin in order to run a code coverage tool and perform various operations on the product.

In one example, a computer system implementing the method may provide for testing by distributing the code coverage testing effort. Any user, not merely one who is a specialized software developer, wishing to test a part of software can upload data needing testing to a database. Testing can be performed on a code coverage provider system (such as on a customer site), thus providing a way to collect data during debugging of issues on the code coverage provider system. A product vendor can provide a code coverage plugin for software testing as part of or in addition to a software product. Thus, the code coverage plugin provides code coverage functionality that may be encapsulated as part of a released product allowing testing to be performed by any user wishing to do so using code coverage.

The end-user performing testing can turn on/off code coverage using a user interface, command-line-interface, etc., or another application program interface (API). Thus, the end-user can turn on code coverage, perform the necessary tests or perform issue reproduction and then turn code coverage off. At the end of testing, the end-user will be able to choose if he/she wants to view code coverage results or send the results elsewhere. The end-user may, for example, view the code coverage results locally on his/her machine, or provide the results to a remote database for further processing.

Various aspects of the above referenced methods and systems are described in details herein below by way of examples, rather than by way of limitation.

FIG. 1 is an example system architecture for implementing a code coverage plugin. In one example, system architecture 100 includes a client system 102, a third-party provider 104, a code coverage provider system 106, and a storage 110. In one example, client system 102 may be a computing device, such as a personal computer, personal digital assistant, laptop computer, tablet computer, etc. Client system 102 includes a user interface 134. User interface 134 may be used to display a software program, software source code, code coverage results, webpages, documents, file systems, etc. In one example, code coverage provider system 106 may be a computing device such as, for example, a server computer, a desktop computer, a gateway computer or any other suitable computer system. Third-party provider 104 may be a third-party such as a manufacturer of particular software. In an implementation, third-party provider 104 stores or has access to source code for particular software. Third-party provider 104 may operate one or more websites that provides access to the source code.

Storage 110 may be a storage service accessible via the Internet and may store software components such as source code, code coverage results, etc. In an implementation, storage 110 may be cloud storage.

Client system 102, third-party provider 104, code coverage provider system 106, and storage 110 may be coupled to a network 108. Client system 102 and code coverage provider system 106 may reside on different Local Area Networks (LANs) that may be coupled together via the Internet but separated by firewalls, routers, and/or other network devices. Alternatively, client system 102 and code coverage provider system 106 may reside on a LAN and may be incorporated into the same physical or logical system, or different physical or logical systems. In yet another configuration, client system 102 and the code coverage provider system 106 may reside on different servers, coupled to other devices via a public network (e.g., the Internet) or a private network (e.g., LAN). Alternatively, client system 102 and code coverage provider system 106 may reside on the same server. It should be noted that various other network configurations can be used including, for example, hosted configurations, distributed configurations, centralized configurations, etc.

Code coverage provider system 106 includes an enterprise machine 140. In an implementation, enterprise machine 140 may be a virtual machine or another type of machine. Enterprise machine 140 includes a file repository 145, an engine service 147, a code coverage plugin 149, an environment data container 170, and a code coverage tool 143. In an implementation, any of file repository 145, engine service 147, environment data container 170, and code coverage tool 143 may be external to enterprise machine 140. Engine service 147 is used by code coverage plugin 149 to start/stop the enterprise machine 140's engine. Engine service 147 may be a tool that can reload/restart a program after successful instrumentation or when the instrumentation is undone. A code coverage agent 151 may collect execution information and dump it on request or when environment 135 exits. Environment data container 170 may be a database that stores a backup of files. Code coverage provider system 106 also includes application 180A, application 180B, application 180C, a middleware 130, and an environment 135. Environment 135 includes a code coverage agent 151. In an implementation, environment 135 may be an execution environment such as a JAVA virtual machine (JVM). Code coverage agent 151 may be an agent that uses instrumentation to record execution coverage data. In an implementation, code coverage agent 151 is a JaCoCo agent. Middleware 130 includes a memory data structure 144. Although middleware 130 and environment 135 are depicted as being separate from enterprise machine 140, in another implementation (not depicted), middleware 130 and/or environment 135 may be included within enterprise machine 140. Applications 180A-180C are provided for exemplary purposes only and more or less applications than depicted may be used. An application is also referred to as a software program or product. Code coverage plugin 149 is provided by a product vendor of applications 180A-C as a part of or in addition to the application/program/product. Thus, in an implementation, code coverage functionality is encapsulated as part of a released product. Applications 180A-C may be applications that are being tested.

Code coverage provider system 106 may be employed for providing a set of utilities for testing software applications. Code coverage provider system 106 may provide instrumentation of a software application. Therefore, a test file or an API that is supported by the software application may be used in order to test/run it. Remote execution of the software application (i.e., executing the software application from a location remote from the software application itself) may depend upon implementation. A software application may include one or more executable modules that are derived from source code. In one example, one of the utilities provided by code coverage provider system 106 is a library of files stored in a file repository 145 in enterprise machine 140. The files are test case files of software applications. The test case files may comprise software scripts designed to control some particular operation of a software application or project. In the depicted implementation, file repository includes original files 155 and files that are modified are called instrumented files 156. Original files 155 may be modified to create instrumented files 156 in several ways. In one implementation, a file that contains code to execute the software application may be modified by a code coverage tool. In another implementation, a text file that contains dependencies that are to be modified may be modified by the code coverage plugin 149. It should be noted that the terms software application, software, and software project may be used interchangeably.

In an implementation, test case files (also referred to as "package files") may be used by an end-user to determine if a software application or a feature(s) of the software application is likely to have issues or bugs. Test case files may be scripts, application executable files, or data files. A system may also provide code coverage for each test case file. For example, the test case files may include test inputs, classes, or execution conditions that can be executed by code coverage provider system 106 for opening applications, loading data, simulating user interactions, etc. A test input, may be a known input to a software application, that when executed by the software application produces an expected output. Execution conditions specify the conditions under which the software application is to be executed. A test input may include variables or conditions, such as execution conditions. Code coverage provider system 106 may provide other testing utilities other than or in addition to code coverage such as, performance measurement utilities, program execution logs, generation of graphical user interface reports for code coverage, etc. An example of a testing utility may be a code coverage tool itself, such as the JaCoCo agent.

Code coverage provider system 106 provides code coverage for each test case/package files in file repository 145 by providing the code coverage plugin 149 that launches code coverage tool 143. Code coverage is a metric that may be used to describe the level or degree to which the source code of a software application is tested by a particular test case. A program with high code coverage has been more thoroughly tested and has a lower chance of containing software bugs than a software application with low code coverage.

Code coverage metrics include an attribute that indicates what unit of source code of a software projects is tested by a test case. Specifically, the attributes indicate which assembly, class, method or line of code a test case covers. Code coverage techniques include, for example, line coverage, branch coverage, statement coverage, condition coverage, multiple condition coverage, parameter value coverage, decision coverage, function coverage, and path coverage. Line coverage is a metric including an attribute that indicates whether a line of the source code of the software application is executed by a test case. Branch coverage is a metric including an attribute that indicates whether branches or code decision points of the source code of the software project that are executed in a test case. Statement coverage is a metric including an attribute that indicates statements of the source code of the software project that were that are executed in the completed test case. Condition coverage is a metric comprising an attribute that indicates if each Boolean sub-expression (i.e., condition) of the source code of the software project has been evaluated as true and false. Multiple condition coverage is a metric including an attribute that indicates if all combinations of conditions inside each decision of the source code of a software project are tested by the test case. Parameter value is a metric including an attribute that indicates that in a method taking parameters of the source code of the software project, all common values for such parameters have been considered for an executed test case. For each type of code coverage, a coverage metric may be determined, e.g., measured as a ratio of units of source code tested by the test case to total units of source code of the software application.

Code coverage techniques may allow users to look for parts of a software application that are rarely or never accessed under normal operating conditions and helps reassure end-users that important conditions or functions have been tested. The results of testing performed based on the code coverage may be analyzed to understand what areas of code have not been exercised and test cases may be updated or new test cases implemented to include these areas as necessary.

For example, consider the following function, "foo," located in the file arch/x86/kernel/time.c:

```
int foo (int x, int y)
{
int z=0;
if ((x>0) && (y>0))
{
z=x;
}
return z;
}
```

In this example, function "foo" is part of a larger software application and a test case or test suite was run for the software application. During the execution of the test case, if "foo" was called in at least once, function coverage is satisfied. Statement coverage for "foo" may be satisfied if foo (1,1) and every line of the function is executed included z=x. Branch coverage may be satisfied by calling foo(1,1) and foo(0,1). In the first case, (i.e., foo (1,1)), the two "if" conditions are met and z=x is executed, while in the second case, (i.e., foo (0,1)), the first condition (x>0) is not satisfied, which prevents z=x from executing. Condition coverage may be satisfied with test cases that call foo(1,1), foo(1,0), and foo(0,0). All are required to meet condition coverage because in the first two cases, (x>0) evaluates to true, while in the third, (x>0) evaluates to false. At the same time, the first case evaluates (y>0) true, while the second and third evaluates (y>0) false.

Instead of utilizing traditional IDE or SDKs in order to configure a complicated system to perform testing, a code coverage plugin 149 included in enterprise machine 140 is utilized. An end-user employing client system 102 can perform testing by starting code coverage and performing the necessary tests. The end-user need not be a skilled software developer/engineer, or tester.

In one example, code coverage provider system 106 allows an end-user using client system 102 to interact with code coverage provider system 106 and test cases. Code coverage plugin 149 allows the end-user to determine, select, and execute test cases for a unit of source code of a software application. Code coverage may be started or stopped, coverage data may be collected, sent and shown. In order to determine test cases, an end-user may start code coverage by sending a command to code coverage plugin 149. In order to select test cases, an end user may run test cases use instrumented software. In an implementation, the end-user may use instrumented software in a similar manner as the software was used prior to instrumentation. In other words, the end-user's decisions with respect to selecting and executing test cases on instrumented software may not be affected by software instrumentation. In order to execute test cases, an end-user may either collect code coverage data or stop code coverage and then collect code coverage data. Code coverage plugin 149 allows the end-user to identify one or more units of source code, for example by a package file name, and obtain the test cases from file repository 145 that cover the identified unit of source code. Suppose that an end-user selects a first package file to test. The end-user may wish to start code coverage on the first package file. In an implementation, code coverage plugin 149 may graphically present the test cases (retrieved from file repository 145) that cover the unit of source code identified by the end-user on client system 102. The end-user may select, via graphical-user-interface or other means, one or more of the presented test cases. In another implementation, code coverage plugin 149 may not provide an indication of test cases to the end-user but instead start the code coverage to test an entire unit of source code upon receiving a request to start coverage from the end-user.

When the end-user issues a start coverage request, the start coverage request is sent from client system 102, via an application program interface, to code coverage provider system 106, via network 108. Specifically, code coverage plugin 149 of enterprise machine 140 receives the start coverage request from client system 102, via network 108. The end-user may select an option to start code coverage via user interface 134. Alternatively, the request to start code coverage may be generated and sent to the code coverage plugin periodically on a schedule. A back-up of original configuration files associated with the first package file is performed by storing original machine parameters and the first package file. The original machine parameters and the first package file include data that is to be affected or changed by the code coverage. These parameters and the first package file may be combined into one or more configuration files. For example, as shown in FIG. 1, code coverage plugin 149 backs-up the original configuration files by retrieving original files 155 (including the original machine parameters and the first package file) from file repository 145 and storing the original files 155 (including the original machine parameters and the first package file) in environment data container 170.

In an implementation, the backing up and storing of the original configuration files allows for roll-back in case of code coverage tool error or failure. As the original configuration files are properly backed up, upon detection of a failure, the end-user is alerted and can issue a stop coverage request to stop code coverage. Suppose that the error occurs when a second package file (which is an instrumented version of the first package file created for testing) causes an error and the code coverage tool 143 recognizes the error. In response to receipt of the error with respect to the second package file issued by the code coverage tool, a roll-back to the original configuration files, including the first package file, is performed by the code coverage plugin 149 so that the error can be addressed and fixed in the first package file. An error may occur when testing of the first package file produces behavior which is not the apparent intentional behavior of the first package file. The erroneous files, which do not behave in a manner that is the intention of the first package file, can then be discarded. This allows the correction of the error. In an implementation, the performing of the backup of one or more original configuration files associated with the first package file includes storing original machine parameters and the first package file, where the backup is performed prior to any modification to memory data structure 144 in middleware 130 (needed in order to start the code coverage).

The code coverage tool 143 may recognize errors such as instrumentation failures and configuration failures. Instrumentation failures may occur when the code coverage tool fails when it tries to instrument original file(s). The code coverage tool may fail with exception or exit with a meaningful return status. The failure (e.g., failure with exception or exit with a meaningful return status) may depend upon the code coverage tool 143. Configuration failures may be a result of dependencies issue(s). For example, if a code coverage tool 143 successfully instruments the original files but the code coverage plugin 149 fails to restart/reload an instrumented file, the code coverage plugin 149 may issue a notification of the failure. The notification may be issued because of a failure to restart/reload an instrumented program. Subsequently, a roll back instrumentation to roll-back to the original files may be performed.

After performing the back-up of configuration files, configuration of the code coverage tool 143 can be performed. Code coverage plugin 149 configures code coverage tool 143. Code coverage parameters relevant to the particular data/program being tested are obtained from environment data container 170. These code coverage parameters may include, for example, path to files, or other parameters provided by manufacturer of the data/program. Path to files may be original files and original configuration files. The path to files may be relative paths to source files and relevant system files, environment variables names and values, parameters for the code coverage tool, parameters for the code coverage plugin 149. In an implementation, environment data container 170 may include product specific data for the path to files or other parameters.

After configuration of code coverage tool 143, memory data structure 144, utilized for the testing in middleware, is modified to register code coverage tool 143 (used to start the code coverage) in middleware 130. Memory data structure 144 organizes data in middleware 130 testing on a package file can be performed. In an implementation, along with the registration of the code coverage tool, any needed dependencies are added. In an implementation, modules may be running in middleware 130. A JaCoCo agent module may be added as a dependency for instrumented modules. Otherwise, instrumented modules may fail to load.

After configuration and registration of code coverage tool 143 is performed, code coverage tool 143 adds the relevant code coverage parameters to code coverage agent 151 in environment 135. Code coverage tool 143 is then ready to be launched.

Code coverage tool 143 is then launched and testing is started. The first package file (i.e., one of original files 155) is modified to create an instrumented second package file (i.e., one of instrumented files 156). Thus, the first package file is replaced with a second package file that has been modified and instrumented by code coverage tool 143. The instrumented second package file results from a code coverage tool run. For example, a code coverage tool 143 may add extra code that increment counters. The counters may be used to indicate an occurrence (e.g., something was reached). For example, if a block of code does not get executed, then the counter for that block will remain zero. Testing may start after the start code coverage step is completed. Testing may be performed on any operation that may be performed using instrumented software.

A status of the testing performed on the first package file is generated by code coverage tool 143. The status is retrieved by code coverage plugin 149 from code coverage tool 143. The status may indicate whether or not there are any errors in testing/performing the instrumentation of the files. If the status is indicative of an error in performing instrumentation of the second package file, code coverage plugin 149 may alert the end-user and provide an error message for display. In response to receipt of the status indicative of the error with respect to the second package file issued by code coverage tool 143 in FIG. 1, a roll-back to the original configuration file including the first package file is made. Code coverage tool 143 is added as a dependency for the instrumented files (included in the second package file). For example, the code coverage tool 143 may be added as a dependency and it may be added by the code coverage plugin 149 (e.g., by editing a relevant configuration file). The addition of the code coverage tool 143 as a dependency for the instrumented machine files provides modification of configuration files in middleware 130. In an implementation, code coverage tool 143 should be added as a dependency for each instrumented file. An enterprise archive (EAR) is a file format used for packaging one or more modules into a single archive so that deployment of the various modules onto an application server occurs simultaneously and coherently. In an implementation, the code coverage agent 151 should be added as dependency to an EAR's metadata. A relevant EAR file may encapsulate modules. A code coverage agent 151 may be added as a dependency for each module that was instrumented and it may be added to metadata of an EAR that encapsulates these modules. In a further implementation, the code coverage tool 143 should be added as a dependency for a relevant EAR file as well. When code coverage stops, these dependencies should be removed and any modified files are then replaced with original files 155.

Engine service 147 is then restarted upon successful instrumentation. Engine service 147 is used by code coverage plugin 149 to start/stop enterprise machine 140's engine. After the engine service 147 is restarted, the instrumented files 156 (including the second package file) will be available for use. In an implementation, testing will have been performed on the first package file, and an instrumented second package file will be available for an end-user employing client system 102.

After engine service 147 restarts and instrumentation is successful, code coverage testing on the relevant portion of the source code can be performed.

For example, the end-user may select test cases, via user interface 134, to test. Code coverage provider system 106 may execute the selected test cases and deliver the results to the end-user, via user interface 134. User interface 134 may be a graphical user interface (GUI). The end-user may then perform testing on a portion of the application.

At the end of testing (or at any point during after issuance of the start coverage request), the end-user may issue a stop coverage request. The request to stop the level of testing on the first package file may be issued for a variety of purposes. The end-user employing client system 102 who issues the stop request may select an option to stop the level of testing via user interface 134 in FIG. 1. Alternatively, the request to stop the level of testing may be generated and sent to the code coverage plugin periodically on a schedule after coverage is started. In response to receiving a stop request, code coverage plugin 149 restores the original configuration files (previously backed up after receiving the start coverage request). In an implementation, restoration of the original configuration files provides optimization for subsequent instrumentation. For example, restoring of original configuration files provides storing of instrumented files and instrumentation of configuration files such that when a subsequent start request is issued (and start command is performed), the instrumentation performed by the code coverage tool 143 to create the second package file can be skipped (as it has already been performed). Thus, when a subsequent start request is issued, the time and resources dedicated to performing instrumentation is saved as the instrumentation has previously been performed.

After receiving acknowledgment of a successful restoration of configuration files, code coverage plugin 149 restarts engine service 147.

A collect coverage data request, for the code coverage results of the testing performed on the first package file, for which code coverage has been started (and optionally, stopped) is then received by code coverage plugin 149. In an implementation, the code coverage data may be collected dynamically as the files are being instrumented. Therefore, as soon as the files are instrumented, coverage data can be collected. In this implementation, the start coverage request must have previously been issued. In another implementation, the request to collect coverage data may include an indication that the coverage data is to be collected in one step after stopping coverage. In this implementation, the stop coverage request must have previously been issued. The collected coverage data is then stored. In an implementation, the coverage data may be collected dynamically. In another implementation, the coverage data may be collected in one step after stopping code coverage. In an implementation, the collect coverage data request in may include an indication of how the coverage data is to be collected. In another implementation, the coverage data may be collected based on user input, or a default way of collecting coverage data may be set. In yet another implementation, code coverage plugin 149 in FIG. 1 may determine whether the code coverage has been started and stopped. If code coverage has started and stopped, code coverage plugin 149 would determine to collect coverage data in one step (as the stop coverage request has been issued). In another implementation, code coverage plugin 149 may determine whether the code coverage has only started and not stopped. If code coverage has started but not stopped, code coverage plugin 149 would determine to collect coverage data on the fly or dynamically. Other ways of determining how to collect coverage data may be used. Code coverage plugin 149 communicates with code coverage tool 143 to collect the coverage data. Code coverage tool 143 collects the coverage data from code coverage agent 151 in environment 135. The coverage data may then be stored as coverage data a binary file or may be transferred via a network. The data file may contain statistics about code usage. The file may be used together with the source code in order to create a code coverage detailed report.

The coverage data stored can then be sent out to the end-user who started/stopped code coverage or to another machine/user for further evaluation. Code coverage plugin 149 receives a send coverage data request and retrieves source code relative paths for the files that are tested. Relative paths represent relative files (source code files) for which source paths could differ. In contrast, absolute paths represent absolute files which are hard-code files for which the locations do not change. Code coverage plugin 149 retrieves the source code relative paths from environment data container 170 (or another database such as a source file repository) via a configuration file indicating the location of the database.

Code coverage plugin 149 requests a coverage report from code coverage tool 143. In an implementation, the report is in a form of a binary file that contains coverage data to be provided to a recipient who has access to relevant source code.

In an implementation, source code may not be a part of a released program (on which testing is performed). Therefore, when the coverage report is provided to the recipient, the recipient can obtain the relevant source code in order to produce a code coverage report that is readable by the recipient. For example, the code coverage report may be represented for display on a graphical user interface and may be color-coded.

The coverage report, send by code coverage tool 143, is received by code coverage plugin 149 so it can be sent to a recipient. In an implementation, prior to being received, relevant source and is obtained (by code coverage plugin 149, for example) using the source code relative paths and sent to code coverage tool 143. The relevant source code may be downloaded from a website and saved locally, for example. In another implementation, the relevant source code may be saved onto a server, such as server 110 which can be accessed by one or more users via the Internet. Code coverage tool 143 may then combine the relevant source code with coverage data to generate the coverage report.

In an implementation, prior to the coverage report being generated by code coverage tool 143, code coverage tool 143 determines whether the version of the relevant source code for which the coverage report is to be generated is the latest version or the correct version. In response to determining that the version of the relevant source code is the appropriate version, the coverage report can be generated.

The code coverage report may be generated by the code coverage tool 143. The report may be configured and provide data such as source code, code coverage results data files, data included/excluded from code coverage.

In another implementation, if relevant source code is unavailable and cannot be viewed by users, developers, testers, etc., code coverage plugin 149 may send out a coverage results binary file including the coverage data obtained from code coverage tool 143 to third-party website 104. For example, the third-party website may be managed by a manufacturer of the program or the portion of the program being tested and for which the testing is performed. The third-party website may then combine the relevant source along with the coverage results binary file and send the combination (to be displayed to an end-user) as an attachment to code coverage plugin 149. As described above, the binary file may include coverage data.

The coverage report is then sent to an appropriate recipient. For example, the report may be sent to an end-user employing client system 102.

The end-user may then wish to view the coverage data in the coverage report. The end-user may issue a show coverage data request. The coverage data that is to be displayed to the end-user is provided based on how the coverage report was generated. For example, if the coverage report was generated using the relevant source code obtained from a provider, such as a third-party provider 104, the coverage data may be provided for display on a website. If the coverage report was generated using relevant source code that was downloaded or somehow accessed locally, the coverage data can be provided for display locally on the client system.

The start coverage, stop coverage, collect coverage data, send coverage data and show coverage data requests received by the code coverage plugin 149 may be further described in FIGS. 2-6.

Code coverage provider system 106 allows an end-user employing client system 102 to test a unit of source code of a software project without requiring a special product build/environment. Such is made possible by using code coverage plugin 149. The various files contained in file repository 145 allow the end-user to perform the testing.

Source code can be stored on server 110 or elsewhere.

FIG. 2 is a flow diagram illustrating an example method for starting code coverage, according to an implementation of the disclosure. Method 200 may be performed by processing logic that may comprise hardware (e.g., circuitry, dedicated logic, programmable logic, microcode, etc.), software (such as instructions run on a processing device), firmware, or a combination thereof. In one implementation, method 200 is performed by code coverage plugin 149 of FIG. 1. In another implementation, method 200 may be performed by one or more components of enterprise machine 140 of FIG. 1.

Method 200 begins at block 202 where the processing logic implementing the method receives, via an application program interface, a request to start a level of testing on a first package file. The level of testing includes a code coverage level, in an implementation. In an example, the request may originate from client system 102 in FIG. 1. In another example, the request may originate elsewhere. Code coverage plugin 149 of enterprise machine 140 receives the start coverage request from client system 102, via network 108.

Method 200 continues at block 204 where the processing logic backs-up original configuration files associated with the first package file by storing original machine parameters and the first package file. For example, as shown in FIG. 1, code coverage plugin 149 backs-up the original configuration files by retrieving original files 155 (including the original machine parameters and the first package file) from formal file repository 145 and storing the original machine parameters and the first package file in environment data container 170.

Method 200 continues to block 206, where the processing logic performs configuration of a code coverage tool used to perform the level of testing. In an implementation, in order to perform configuration of code coverage tool 143 in FIG. 1, code coverage parameters relevant to the particular data/program being tested (in this case, the first package file) are obtained from environment data container 170.

Method 200 continues to block 208, where the processing logic modifies a memory data structure, utilized for the testing in middleware, to register the code coverage tool used to start the testing at the level on the first package file. The code coverage tool is registered in middleware. In an implementation, memory data structure 144 is modified to register code coverage tool 143 in FIG. 1 with middleware 130.

After configuration and registration of code coverage tool 143 is performed, code coverage tool 143 adds relevant code coverage parameters (obtained in block 206) to code coverage agent 151 in environment 135.

Method 200 continues to block 210 where the processing logic launches the code coverage tool to start the level of testing by replacing the first package file with a second package file modified and instrumented by the code coverage tool. Code coverage tool 143 in FIG. 1 is launched and the first package file is instrumented/modified to produce a second package file. Then, the first package file is replaced with second package file.

Method 200 continues to block 212 where the processing logic retrieves a status from the code coverage tool.

Method 200 continues to block 214 where the processing logic adds the code coverage tool as a dependency for the second package file. As code coverage tool 143 in FIG. 1 is already registered (as shown in block 208), code coverage tool 143 can be added as a dependency for the instrumented files (e.g., including the second package file).

Method 200 continues to block 216 where the processing logic restarts an engine service upon successful instrumentation. Engine service 147 in FIG. 1 is restarted upon successful instrumentation. Testing can then be performed by the end-user on the second package file at the level provided by the end-user. For example, if the level of testing is a high code coverage level, the testing will be thorough/vigorous than if the level of testing was a low code coverage level.

FIG. 3 is a flow diagram illustrating an example method for stopping code coverage, according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by code coverage plugin 149 of FIG. 1. In another implementation, method 300 may be performed by one or more components of enterprise machine 140 of FIG. 1.

Method 300 begins at block 302 where the processing logic implementing the method receives a request to stop the level of testing on the first package file. For example, the request may originate from client system 102 in FIG. 1. In another example, the request may originate elsewhere. Code coverage plugin 149 of enterprise machine 140 receives the stop coverage request from client system 102, via network 108. An end-user employing client system 102 may wish to stop the level of testing on the first package file (for which the level of testing was started, as described in FIG. 2). As described above with respect to FIG. 2, the level of testing comprises a code coverage level, in an implementation.

Method 300 continues to block 304 where the processing logic restores the original configuration files, including the first package file. For example, the original configuration files in block 204 in FIG. 2, as it was prior to starting/stopping coverage, are restored.

Method 300 continues to block 306 where the processing logic restarts the engine service upon a successful restoration of the original configuration files, including the first package file. Upon code coverage plugin 149 in FIG. 1 receiving acknowledgment of a successful restoration of configuration files from one or more of file repository 145, middleware 130, and/or environment 135, coverage plugin 149 restarts engine service 147.

FIG. 4 is a flow diagram illustrating an example method for collecting coverage data, according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by code coverage plugin 149 of FIG. 1. In another implementation, method 400 may be performed by one or more components of enterprise machine 140 of FIG. 1.

Method 400 begins at block 402 where the processing logic implementing the method receives a collect coverage data request to collect coverage data. For example, the request may originate from client system 102 in FIG. 1. In another example, the request may originate elsewhere. Code coverage plugin 149 of enterprise machine 140 receives the collect coverage data request from client system 102, via network 108. An end-user employing client system 102 may wish to collect coverage data on the first package file for which code coverage was started and stopped, as described in FIG. 2 and FIG. 3, respectively.

Method 400 continues to block 404 where the processing logic collects and stores the coverage data. In an implementation, the coverage data may be collected dynamically or in one step.

FIG. 5 is a flow diagram illustrating an example method for sending coverage data, according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by code coverage plugin 149 of FIG. 1. In another implementation, method 500 may be performed by one or more components of enterprise machine 140 of FIG. 1.

Method 500 begins at block 502 where the processing logic implementing the method receives a send coverage data request to send coverage data results. For example, the request may originate from client system 102 in FIG. 1. In another example, the request may originate elsewhere. Code coverage plugin 149 of enterprise machine 140 receives the send coverage data request from client system 102, via network 108. An end-user employing client system 102 may wish to send the coverage data which was collected and stored, as described in FIG. 4. In an implementation, the request to send coverage data may be issued manually by an end-user. In another implementation, the request to send coverage data may be issued automatically in response to the collected coverage data being stored, after block 404 in FIG. 4.

In an implementation, in response to the coverage data request, code coverage plugin 149 retrieves source code relative paths for the first package file affected by the testing performed.

Method 500 continues to block 504 where the processing logic requests a coverage report. A coverage report is requested from code coverage tool 143. In an implementation, the relevant source code may be downloaded or otherwise obtained by code coverage tool 143. Code coverage tool 143 may then combine the relevant source code retrieved with coverage data (from block 404 in FIG. 4) to generate the coverage report.

Method 500 continues to block 506 where the processing logic receives a coverage report.

Method 500 continues to block 508 where the processing logic sends the coverage report to an appropriate recipient. The coverage report received and/or otherwise obtained in block 506 is sent to a recipient. The code coverage report (including the relevant source code and coverage results) is provided to a recipient such as an end-user employing client system 102.

FIG. 6 is a flow diagram illustrating an example method for showing code coverage, according to an implementation of the disclosure. Method 600 may be performed by processing logic that may comprise hardware (e.g., circuitry, dedicated logic, programmable logic, microcode, etc.), software (such as instructions run on a processing device), firmware, or a combination thereof. In one implementation, method 600 is performed by code coverage plugin 149 of FIG. 1. In another implementation, method 600 may be performed by one or more components of enterprise machine 140 of FIG. 1.

Method 600 begins at block 602 where the processing logic implementing the method receives a show coverage data request to show coverage data. The request may be sent from an end-user employing client system 102 who wishes to view the coverage data.

Method 600 continues to block 604 where the processing logic provides the coverage data in a format suitable for display. The coverage data that is provided in a format suitable for display to the end-user is displayed based upon how the coverage report was generated and provided to the recipient in FIG. 5. For example, if the coverage report was generated using the relevant source code obtained from a website, such as a third-party website, the coverage data may be provided for display on a website. If the coverage report was generated using relevant source code that was downloaded or somehow accessed locally, the coverage data can be provided for display locally on the client system.

Figure 7:
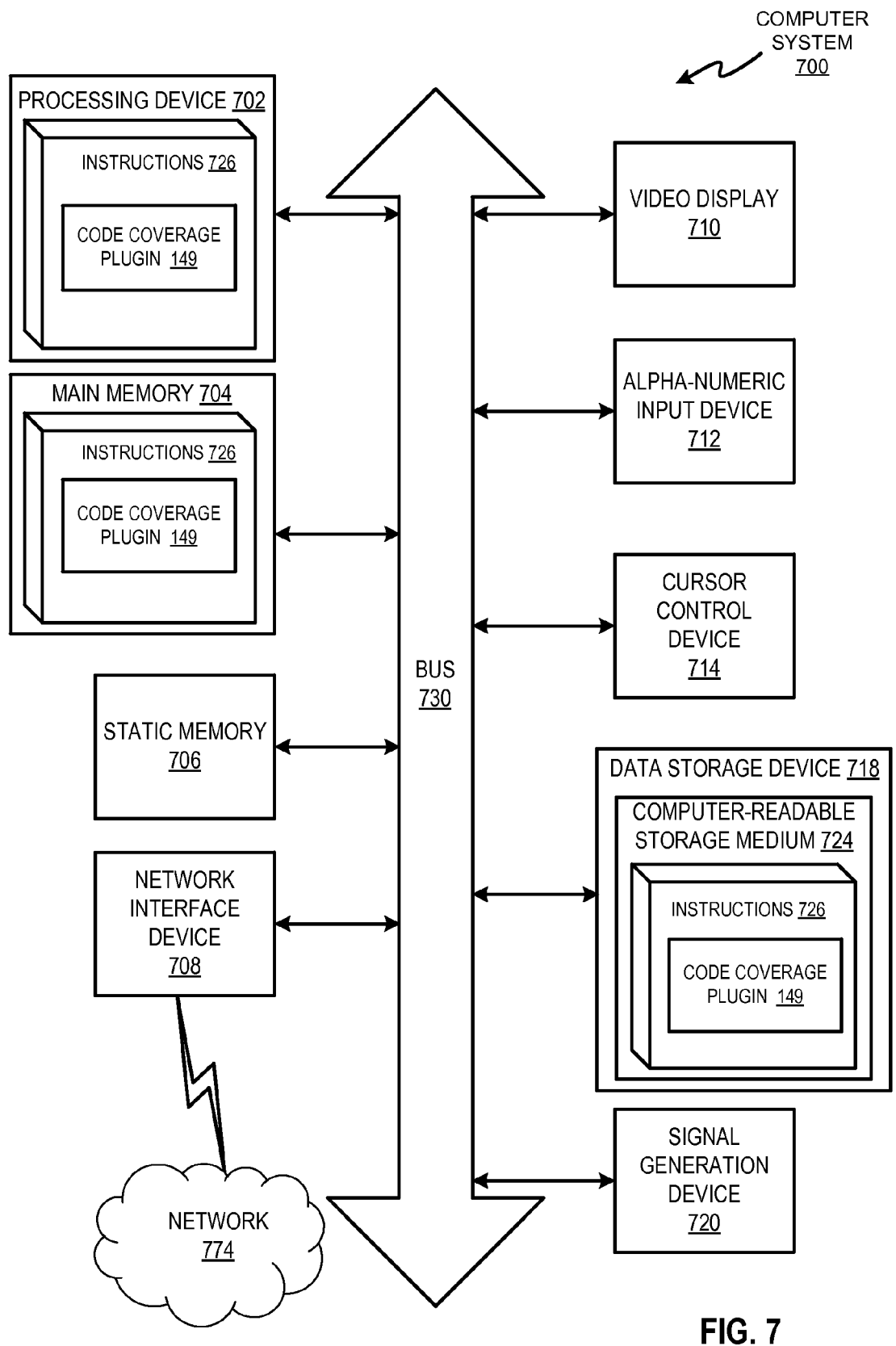
FIG. 7 illustrates a block diagram of an illustrative computing device operating in accordance with the examples of the present disclosure.

FIG. 7 illustrates a block diagram of an illustrative computing device operating, in accordance with the examples of the disclosure. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the instructions 726 for performing the operations and steps discussed herein.

In accordance with one or more aspects of the present disclosure, processing device 702 may be configured to execute code coverage plugin 149 implementing methods 300, 400, 500, and 600 for host virtual address reservation for guest memory hot-plugging.

The computer system 700 may further include a network interface device 708 communicably coupled to a network 774. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored instructions 726 embodying any one or more of the methodologies of functions described herein. The instructions 726 may also reside, completely or at least partially, within the main memory 704 as instructions 726 and/or within the processing device 702 as instructions 726 during execution thereof by the computer system 700; the main memory 704 and the processing device 702 also constituting machine-accessible storage media.

In accordance with one or more aspects of the present disclosure, instructions 726 may comprise executable instructions encoding various functions of code coverage plugin 149 implementing methods 300, 400, 500, and 600 for testing.

The computer-readable medium 724 may also be used to store instructions 726 to implement code coverage provider system 106 to implement any one or more of the methodologies of functions described herein in a computer system, such as the system described with respect to FIG. 1, and/or a software library containing methods that call the above applications.

While the computer-readable storage medium 724 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosure. The term "computer-readable storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "initiating", "generating", "determining", "sending", "invoking", "storing", "updating", "identifying", "presenting", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable storage medium having stored thereon instructions, which may be used to program a computer system (or other electronic devices) to perform a process according to the disclosure. A machine-readable storage medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method comprising:
receiving, by a processing device via an application program interface, a request to start a level of testing on a first package file;
modifying, by the processing device, a memory data structure utilized for the level of testing in middleware, the middleware to register a code coverage tool used to start the level of testing on the first package file;
launching the code coverage tool to start the level of testing by replacing the first package file with a second package file that has been modified and instrumented by the code coverage tool; and
adding the code coverage tool as a dependency for the second package file, wherein the adding the code coverage tool as the dependency comprises editing a configuration file associated with the second package file to include the dependency of the code coverage tool.

2. The method of claim 1, wherein the level of testing comprises a code coverage level.

3. The method of claim 1, further comprising
performing a backup of one or more original configuration files associated with the first package file by storing original machine parameters and the first package file, wherein the backup is performed prior to the modifying the memory data structure.

4. The method of claim 3, further comprising
in response to receipt of an error with respect to the second package file issued by the code coverage tool, configuring a roll-back to the one or more original configuration files including the first package file.

5. The method of claim 3, further comprising:
receiving a request to stop the level of testing on the first package file; and
restoring the one or more original configuration files.

6. The method of claim 1, further comprising:
receiving a collect coverage data request to collect coverage data, the coverage data indicative of the level of testing on the first package file; and
collecting and storing the coverage data.

7. The method of claim 1, further comprising:
receiving a send coverage data request to send coverage data results;
requesting a coverage report comprising the level of testing on the first package file;
receiving the coverage report; and
sending the coverage report to an appropriate recipient.

8. The method of claim 1, further comprising:
receiving a show coverage data request to show coverage data; and
providing the coverage data in a format suitable for display.

9. A system comprising:
a memory;
a processing device, operatively coupled with the memory, the processing device to:
receive a request to start a level of testing on a first package file;
modify a memory data structure utilized for the level of testing in middleware, the middleware to register a code coverage tool used to start the level of testing on the first package file;
launch the code coverage tool to start the level of testing by replacing the first package file with a second package file that has been modified and instrumented by the code coverage tool; and
add the code coverage tool as a dependency for the second package file, wherein, to add the code coverage tool as the dependency, the processing device is to edit a configuration file associated with the second package file to include the dependency of the code coverage tool.

10. The system of claim 9, wherein the level of testing comprises a code coverage level.

11. The system of claim 9, wherein the processing device is further to perform a backup of one or more original configuration files associated with the first package file by storing original machine parameters and the first package file, wherein the backup is performed prior to the modifying the memory data structure.

12. The system of claim 11, wherein the processing device is further to in response to receipt of an error with respect to the second package file issued by the code coverage tool, configure a roll-back to the one or more original configuration files including the first package file.

13. The system of claim 11, wherein the processing device is further to:
receive a request to stop the level of testing on the first package file; and
restore the one or more original configuration files.

14. The system of claim 9, wherein the processing device is further to:
receive a collect coverage data request to collect coverage data, the coverage data indicative of the level of testing performed on the first package file; and
collect and storing the coverage data.

15. A non-transitory computer readable storage medium including instructions that, when executed by a processing device, cause the processing device to:
receive a request to start a level of testing on a first package file;
modify, by the processing device, a memory data structure utilized for the level of testing in middleware, the middleware to register a code coverage tool used to start the level of testing on the first package file;
launch the code coverage tool to start the level of testing;
modify a second package file to be instrumented by the code coverage tool;
replace the first package file with the second package file; and
add the code coverage tool as a dependency for the second package file, wherein, to add the code coverage tool as the dependency, the processing device is to edit a configuration file associated with the second package file to include the dependency of the code coverage tool.

16. The non-transitory computer readable storage medium of claim 15, wherein the level of testing comprises a code coverage level.

17. The non-transitory computer readable storage medium of claim 15, including further instructions that, when executed by the processing device, cause the processing device to
perform a backup of one or more original configuration files associated with the first package file by storing original machine parameters and the first package file, wherein the backup is performed prior to the memory data structure being modified.

18. The non-transitory computer readable storage medium of claim 17, including further instructions that, when executed by the processing device, cause the processing device to, in response to receipt of an error with respect to the second package file issued by the code coverage tool, configure a roll-back to the one or more original configuration files including the first package file.

19. The non-transitory computer readable storage medium of claim 17, including further instructions that, when executed by the processing device, cause the processing device to:
receive a request to stop the level of testing on the first package file; and
restore the one or more original configuration files.

20. The non-transitory computer readable storage medium of claim 15, including further instructions that, when executed by the processing device, cause the processing device to:
receive a collect coverage data request to collect coverage data, the coverage data indicative of the level of testing performed on the first package file; and
collect and storing the coverage data.

* * * * *